Feb. 18, 1969  E. FORSTNER ET AL  3,428,141
ENGINE COOLING SYSTEM FOR ARMORED VEHICLES, PARTICULARLY TANKS
Filed Dec. 9, 1966
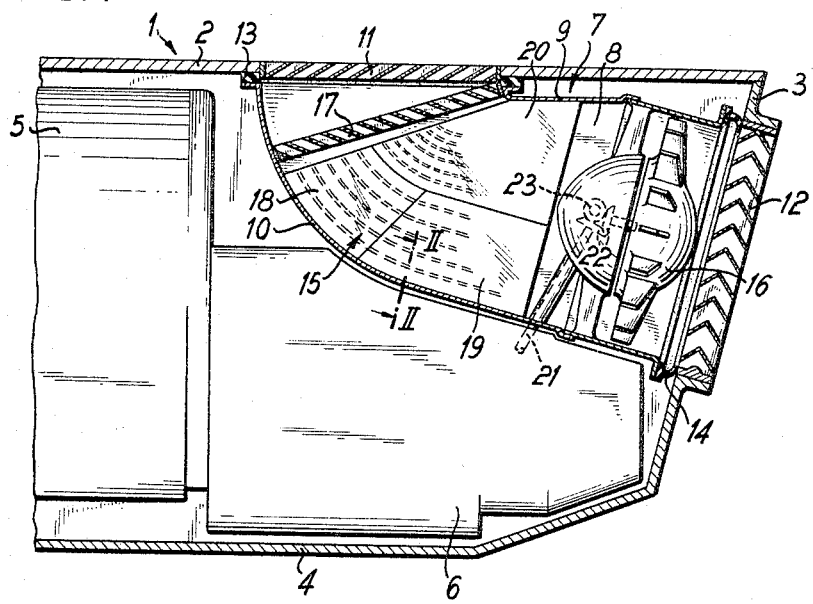
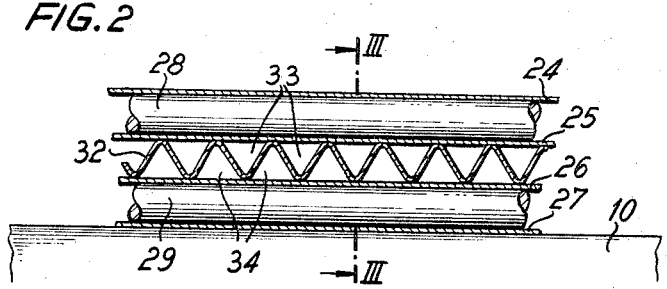
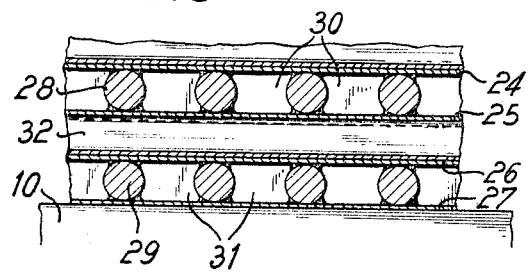
INVENTORS:
Egon FORSTNER
Robert BINDER
BY Dickev Craig
ATTORNEYS

United States Patent Office 3,428,141
Patented Feb. 18, 1969

3,428,141
ENGINE COOLING SYSTEM FOR ARMORED VEHICLES, PARTICULARLY TANKS
Egon Forstner, Stuttgart, and Robert Binder, Schwieberdingen, Germany, assignors to Firma Dr. Ing. H.c.F. Porsche KG, Stuttgart-Zuffenhausen, Germany
Filed Dec. 9, 1966, Ser. No. 600,610
Claims priority, application Germany, Dec. 23, 1965, P 38,417
U.S. Cl. 180—54         10 Claims
Int. Cl. B60k 5/00; F28f 3/00

ABSTRACT OF THE DISCLOSURE

An armored vehicle with a liquid-cooled internal combustion engine in the rear of the vehicle that is provided with a heat exchanger located in a duct extending between an inlet opening in a top wall of the rear body portion and an outlet opening in the end wall of the rear body portion. The duct is arranged so that all of the air entering the inlet travels through the heat exchanger and a suction blower in series to be finally discharged from the outlet opening. The heat exchanger fills the central curved portion of the duct and is provided with passages for the air to guide the air in a duct conforming curve. The heat exchanger fills the major portion of the duct and is constructed of a plurality of separate pre-assembled heat exchangers subsequently assembled in the duct.

Background of the invention

The field of the present invention includes armored vehicles.

In prior art armored vehicles, particularly tanks, a drive unit having a liquid-cooled internal combustion engine is provided in the rear of the vehicle. In the upper and rear walls of the vehicle, similar openings are arranged for the cooling air which is conveyed through a duct and heat exchanger by blowers for cooling the cooling liquid of the internal combustion engine.

In such prior art systems, the cooling blower has been mounted upstream of the heat exchanger to take the cooling air from the engine space that is in communication with the outside air to push the cooling air through the heat exchanger. With this arrangement, the blower sucks warm air from a space of extremely irregular configuration so that the efficiency of the heat exchanger is generally unsatisfactory. The internal combustion engines of armored vehicles are very high powered and produce a correspondingly large amount of heat; a very large additional amount of power must be provided to compensate for the above-mentioned losses. Furthermore, the compression and turbulence produced by the blower will further warm the air prior to its engagement with the heat exchanger.

Thus, the prior art armored vehicles have unsatisfactory, bulky, and inefficient cooling provisions for the internal combustion engines.

Summary of the invention

It is an object of the present invention to improve the efficiency of an internal combustion engine cooling system for an armored vehicle, particularly a tank, while at the same time decreasing the required space.

The present invention relates to an armored vehicle, particularly a tank, with a liquid-cooled internal combustion engine in the rear of the vehicle that is provided with a heat exchanger located in a duct extending between an inlet opening in a top wall of the rear body portion and an outlet opening in the end wall of the rear body portion. The duct is arranged so that all of the air entering the inlet travels through the heat exchanger and a suction blower in series to be finally discharged from the outlet opening. The heat exchanger fills the central curved portion of the duct and is provided with passages for the air to guide the air in a conforming curve. The heat exchanger fills the major portion of the duct and is constructed of a plurality of separate pre-assembled heat exchangers subsequently assembled in the duct.

A single blower may be provided or plural blowers may be arranged in series or parallel. The duct or conduit containing the blower and heat exchanger forms a direct closed passage between the inlet and outlet openings so that there are small aerodynamic and deflection losses. Furthermore, with this direct relationship, the heat exchanger is provided with cool, fresh air directly from the outside, the compression and turbulence heat produced by the blower will have no effect upon the efficiency of the heat exchanger, because the blower is located downstream of the heat exchanger. The duct extending between the inlet and outlet openings consists of first and second portions extending at substantially right angles to their respective openings and a curved connecting third portion. By arranging the heat exchanger in the curved connecting third portion, a relatively large cooling surface is provided even if the height of the conduit is relatively small. Also, the heat exchanger may be provided with a plurality of air-conducting passages that guide the air in its passage through the third curved portion of the duct.

With this arrangement, the flow characteristics of the cooling air are improved and simultaneously the heat exchanger is provided with a relatively large flow of cooling air.

A particularly advantageous feature of the present invention provides a heat exchanger that fills substantially the entire space within the third curved portion of the duct and fills the major space defined by the duct and the inlet and outlet openings.

In order to facilitate the construction and assembly of the heat exchanger, a further feature of the present invention contemplates the division of the heat exchanger into a plurality of individual heat exchanger sections or units that are each capable of conducting liquid and air in heat exchange relationship.

Further objects, features, and embodiments of the present invention will become more apparent from the following detailed description of the preferred embodiment of the present invention shown in the accompanying drawing.

Brief description of the drawing

FIGURE 1 shows a partial schematic longitudinal cross-sectional view taken through the rear of an armored vehicle provided with a cooling unit according to the present invention;

FIGURE 2 is a partial cross-sectional view taken along line II—II of FIGURE 1, on an enlarged scale; and FIGURE 3 is a partial cross-sectional view taken along line III—III of FIGURE 2.

Description of the preferred embodiment

The armored vehicle of the present invention is preferably a conventional tank having a vehicle body 1 provided with an armor plate top wall 2, an armor plate rear end wall 3, and an armor plate bottom wall 4. In the car body 1 there is provided a conventional liquid-cooled internal combustion engine 5 and a gear transmission 6. Only the rear portion of the armored vehicle is schematically shown in FIGURE 1 for purposes of clarity, because the other details of the armored vehicle structure are conventional.

The cooling unit 7 of the present invention is provided rearwardly of the engine 5 and above the gear transmission 6 in the rear end of the armored vehicle. The cooling unit 7 has a cooling air duct or conduit 8 partially defined by walls 9 and 10, which provides a closed air-conducting passageway between an inlet opening 11 in the top wall 2 and an outlet opening 12 in the rear end wall 3 of the armored vehicle body 1. Thus, the conduit or duct 8 is in communication with the outside air at both ends. A suitable grill or grating is provided for each of the openings 11 and 12, and may be of conventional construction. Sealing means 13 and 14 are provided between the terminal ends of the conduit 8 and the circumferential wall portion surrounding the inlet opening and outlet opening, respectively, to prevent the entrance or exit of cooling air from or into any other portion of the vehicle body 1. The conduit portions immediately adjacent to and connected with each of the inlet and outlet openings extend at right angles relative to their respective openings. An intermediate or third portion of the conduit 8 is provided between and connects the other conduit portions.

A heat exchanger 15 is provided for cooling the liquid that in turn cools the engine 5. The heat exchanger 15 is disposed within the conduit 8 to fill a major portion of the space defined by the conduit 8 and the openings 11 and 12. Advantageously, the heat exchanger 15 is mounted and conforms in shape to the third conduit portion that extends in a curve. The heat exchanger 15 serves to guide the cooling air through the curved central portion to produce good flow characteristics and lessen friction flow losses. An axial flow suction blower 16 is mounted within the conduit 8 downstream of the heat exchanger 15 immediately adjacent to the outlet opening 12. Immediately below the inlet opening 11, a splinter or debris catcher 17 is provided in the form of a grid or grating mounted immediately upstream of the heat exchanger 15; this grid 17 being in addition to the usual grill covering the inlet opening 11.

The heat exchanger 15 extends downstream to within the immediate vicinity of the blower 16. The heat exchanger 15 is composed of a plurality of individual pre-assembled heat exchange units 18, 19 and 20, each of which may conduct both liquid and air in heat exchange relationship. The heat exchange units 18, 19 and 20 are easily manipulatable and are assembled within the conduit 8 separately to facilitate the installation of the heat exchanger within the curved portion of the conduit. Advantageously, it is contemplated that the heat exchanger will be in full engagement around the entire circumference of the walls defining the conduit 8; preferably the conduit walls will form part of the heat exchange structure.

It is contemplated that the cooling air blower 16 may be driven by the internal combustion engine 5 directly or through the gear transmission 6 by way of a shaft 21, which drives a bevel gear drive unit 22. If desired, one or more shafts 23 may be connected to the bevel gear drive unit 22 so that additional blowers may be driven. The additional blowers may be placed in the plane of the cooling air blower 16 to provide a plurality of parallel blowers providing for uniform flow of the cooling air through the heat exchanger regardless of the shape of the conduit 8; for example, the conduit 8 may be considerably elongated in one cross-sectional dimension. Also, it is contemplated that a plurality of serially arranged blowers 16 may be provided. Most advantageously, the heat exchanger 15 and conduit 8 will extend across the entire transverse dimension of the vehicle body 1 so that it will be considerably elongated in a dimension perpendicular to the plane of FIGURE 1.

FIGURES 2 and 3 show a preferred construction of the heat exchanger 15 although broadly other heat exchanger construction may be employed. The heat-exchanger 15 comprises a plurality of parallel spaced plates 24, 25, 26, and 27 defining spaces therebetween. A plurality of parallel spaced connecting members or wires 28 and 29 are rigidly connected between the plates 24, 25 and the plates 26, 27, respectively, to define a plurality of separate parallel fluid conduits 30 and 31, respectively, for conducting and guiding the engine cooling liquid through the heat exchangers. The wires 28 and 29 extend generally at right angle to the direction of cooling air flow through the heat exchanger 15. The cooling liquid is supplied to the conduits 30 and 31 by heat exchanger inlet manifolds (not shown) connected with the internal combustion engine and recycled back to the internal combustion engine through heat exchanger exhaust manifolds (not shown); these manifolds and connecting conduits may be conventional heat exchanger construction. A connecting member or corrugated sheet 32 is rigidly connected between the plates 25 and 26 to form a plurality of separate parallel air conduits 33 and 34. The heat exchanger pattern and structure illustrated in FIGURES 2 and 3 may be repeated throughout the entire transverse dimension of the heat exchanger 15 with the plates 24, 25, 26 and 27 conforming to the curvature of the duct 8 to smoothly guide and uniformly distribute the cooling air through the heat-exchanger 15. It is contemplated that the exterior plates, for example, plate 27, may constitute the outer walls of the duct 8.

We claim:

1. An armored vehicle, comprising: a vehicle body having front and rear ends; a liquid-cooled internal combustion engine mounted in the rear end of said vehicle body; the rear end of said vehicle body having a top wall and a rear end wall; an air inlet opening in one of said walls, and an air outlet opening in the other of said walls; closed conduit means connecting said inlet opening with said outlet opening for conducting all of the air entering said inlet opening to said outlet opening; heat exchanger means in said conduit means for cooling the internal combustion engine cooling liquid by heat exchange with the air in said conduit means; suction blower means in said conduit means between said heat exchanger means and said outlet opening for sucking air through said inlet opening and said heat exchanger means and discharging the air through said outlet opening; said top wall comprising a generally horizontally extending armor plate having a grill covering said inlet opening and said rear end wall comprising a generally vertically extending armor plate having a grill covering said outlet opening; said engine being located completely forwardly of said conduit means; and a gear transmission mounted beneath said conduit means.

2. The device of claim 1, wherein said conduit means consists essentially of a first inlet portion connected to and extending at substantially a right angle from said inlet opening, a second outlet portion connected to and extending at a substantially right angle from said outlet opening, and a curved third portion connecting said first and second portions in fluid communication; said heat exchanger means being mounted in said third portion.

3. The device of claim 2, wherein said heat exchanger means includes air passage means conforming to the curvature of said curved third portion for guiding the air through said third portion.

4. The device of claim 3, wherein said heat exchanger means occupies the majority of the space defined by said conduit means, said inlet opening and said outlet opening.

5. The device of claim 4, wherein said heat exchanger means comprises a plurality of separate heat exchanger units, each pre-assembled to conduct both air and liquid in heat exchange relationship and finally assembled in fluid communiction in said conduit means.

6. The device of claim 5, wherein said heat exchanger means substantially completely fills said third conduit means portion; said heat exchanger means comprises a plurality of parallel spaced plates defining spaces therebetween alternately containing air and cooling liquid; a plurality of parallel spaced connecting means rigidly interconnecting said plates and dividing each of said air spaces into a plurality of separate parallel air conduits and dividing each of said liquid spaces into a plurality of separate parallel liquid conduits extending at substantially right angles to said air conduits.

7. The device of claim 1, wherein said heat exchanger means comprises a plurality of separate heat exchanger units, each pre-assembled to conduct both air and liquid in heat exchange relationship and finally assembled in fluid communication in said conduit means.

8. The device of claim 2, wherein said heat exchanger means comprises a plurality of separate heat exchanger units, each pre-assembled to conduct both air and liquid in heat exchange relationship and finally assembled in fluid communication in said conduit means.

9. The device of claim 3, wherein said heat exchanger means comprises a plurality of separate heat exchanger units, each pre-assembled to conduct both air and liquid in heat exchange relationship and finally assembled in fluid communication in said conduit means.

10. The device of claim 1, wherein said conduit means is a single closed tubular conduit extending only between said inlet opening and said outlet opening; said gear transmission being completely located only directly beneath said tubular conduit.

References Cited

UNITED STATES PATENTS

| | | | |
|---|---|---|---|
| 2,242,494 | 5/1941 | Wolf | 180—54 |
| 2,397,809 | 4/1946 | Roeder et al. | |
| 2,869,835 | 1/1959 | Butt | 165—166 |

FOREIGN PATENTS

| | | |
|---|---|---|
| 575,270 | 4/1933 | Germany. |
| 831,597 | 3/1960 | Great Britain. |
| 219,834 | 6/1942 | Switzerland. |

BENJAMIN HERSH, *Primary Examiner.*

MILTON L. SMITH, *Assistant Examiner.*

U.S. Cl. X.R.

165—166